(12) United States Patent
Sweeney et al.

(10) Patent No.: US 8,194,871 B2
(45) Date of Patent: Jun. 5, 2012

(54) SYSTEM AND METHOD FOR CALL PRIVACY

(75) Inventors: Jeffrey M. Sweeney, Olathe, KS (US); Kelsyn D. Rooks, Sr., Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 711 days.

(21) Appl. No.: 11/897,906

(22) Filed: Aug. 31, 2007

(65) Prior Publication Data
US 2009/0061882 A1  Mar. 5, 2009

(51) Int. Cl.
*A61F 11/06* (2006.01)
(52) U.S. Cl. ............ 381/71.1; 381/73.1; 381/94.1; 455/570
(58) Field of Classification Search .... 455/414.1–414.4, 455/445, 563, 569.1–570, 501, 67.13, 295–312; 370/268, 269, 286–292; 375/144, 148; 379/406.01–406.16; 381/71.1–71.14, 73.1, 381/94.1
See application file for complete search history.

(56) References Cited

U.S. PATENT DOCUMENTS

| | | | | |
|---|---|---|---|---|
| 5,526,421 A * | 6/1996 | Berger et al. | ............ | 379/406.06 |
| 7,088,828 B1 * | 8/2006 | Bradford et al. | ............ | 381/71.1 |
| 2002/0131581 A1 * | 9/2002 | Wittke et al. | ............ | 379/406.01 |
| 2003/0177006 A1 | 9/2003 | Ichikawa et al. | | |
| 2004/1005238 | 3/2004 | Ashley at al. | | |
| 2004/0196984 A1 | 10/2004 | Dame et al. | | |
| 2004/0198427 A1 * | 10/2004 | Kimbell et al. | ............ | 455/556.1 |
| 2004/0246862 A1 | 12/2004 | Cho et al. | | |
| 2005/0027520 A1 | 2/2005 | Mattila et al. | | |
| 2005/0065778 A1 * | 3/2005 | Mastrianni et al. | ........ | 704/200.1 |
| 2006/0029212 A1 | 2/2006 | Short et al. | | |
| 2006/0045252 A1 * | 3/2006 | Gorti et al. | ............... | 379/201.02 |
| 2007/0165834 A1 | 7/2007 | Redman et al. | | |
| 2008/0118081 A1 * | 5/2008 | Chang | ......................... | 381/94.1 |
| 2009/0060216 A1 * | 3/2009 | Sweeney et al. | ............. | 381/71.2 |
| 2009/0061882 A1 | 3/2009 | Sweeney et al. | | |

OTHER PUBLICATIONS

Response filed Sep. 23, 2010 for U.S. Appl. No. 11/897,762.
Non-Final Office Action date mailed Jun. 23, 2010 in U.S. Appl. No. 11/897,762.
U.S. Patent Appl. No. 11/897,762; Final Office Action dated Feb. 10, 2012; 21 pages.
U.S. Patent Appl. No. 12/146,876; Final Office Action dated Feb. 15, 2012; 14 pages.

* cited by examiner

*Primary Examiner* — Kent Chang
*Assistant Examiner* — Marcus Hammonds
(74) *Attorney, Agent, or Firm* — Swanson & Bratschun, L.L.C.

(57) ABSTRACT

A system and method for providing call privacy for a wireless communication device. A voice communication is received from a user. The voice communication is processed to determine a response signal in response to receiving the voice signal. The response signal is broadcast about the periphery of the user as the voice input is received. The response signal is operative to cause the voice communication to be less discernible by one or more bystanders.

24 Claims, 7 Drawing Sheets

SYSTEM AND METHOD FOR CALL PRIVACY

BACKGROUND

The use of and development of wireless communications has grown nearly exponentially in recent years. The growth is fueled by larger wireless networks with more reliable protocols and better communications hardware available to service providers and consumers. The increased use of wireless devices has increased the number of conversations that occurs in public locations.

In some circumstances, public use of a wireless device for a verbal conversation may be considered rude, distractive, annoying, impolite, or otherwise sociably improper. Similarly, public conversations may increase the amount of noise pollution in a location to the detriment of individuals near the user's location. Noise pollution may be defined as displeasing human- or machine-created sounds. Some users feel uncomfortable carrying on a verbal conversation in public because they prefer privacy for sharing personal, business, or other information. Despite the issues associated with public conversations, the demands of modern life dictate that verbal conversations will continue to be carried on publicly and in all types of forums, environments, and settings.

SUMMARY

One embodiment includes a system and method for providing call privacy for a wireless communication device. A voice communication may be received from a user. The voice communication may be processed to determine a response signal in response to receiving the voice signal. The response signal may be broadcast about the periphery of the user as the voice input is received. The response signal may be operative to cause the voice communication to be less discernible by one or more bystanders.

Another embodiment includes a wireless device for voice communication. A microphone may be configured to receive voice communication from a user. The wireless device may include a signal generator in communication with the microphone configured to process the voice communication to determine a voice signal and the response of the voice signal. The wireless device may further include a speaker in communication with the digital signal processor configured to broadcast the response signal about the periphery of the user as the voice input is received for reducing the voice communication discernible by one or more bystanders.

Yet another embodiment includes a method for processing a voice signal to generate a response signal. An original voice signal may be received from a first party involved in a communication occurring through a wireless device. The original voice signal may be digitally approximated. A response signal to the original voice signal may be generated. The response signal may be amplified. The response signal may be broadcast from the wireless device to interfere with the original voice signal of the first party, the response signal operative to cause the original voice signal to be less discernible by one or more bystanders.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
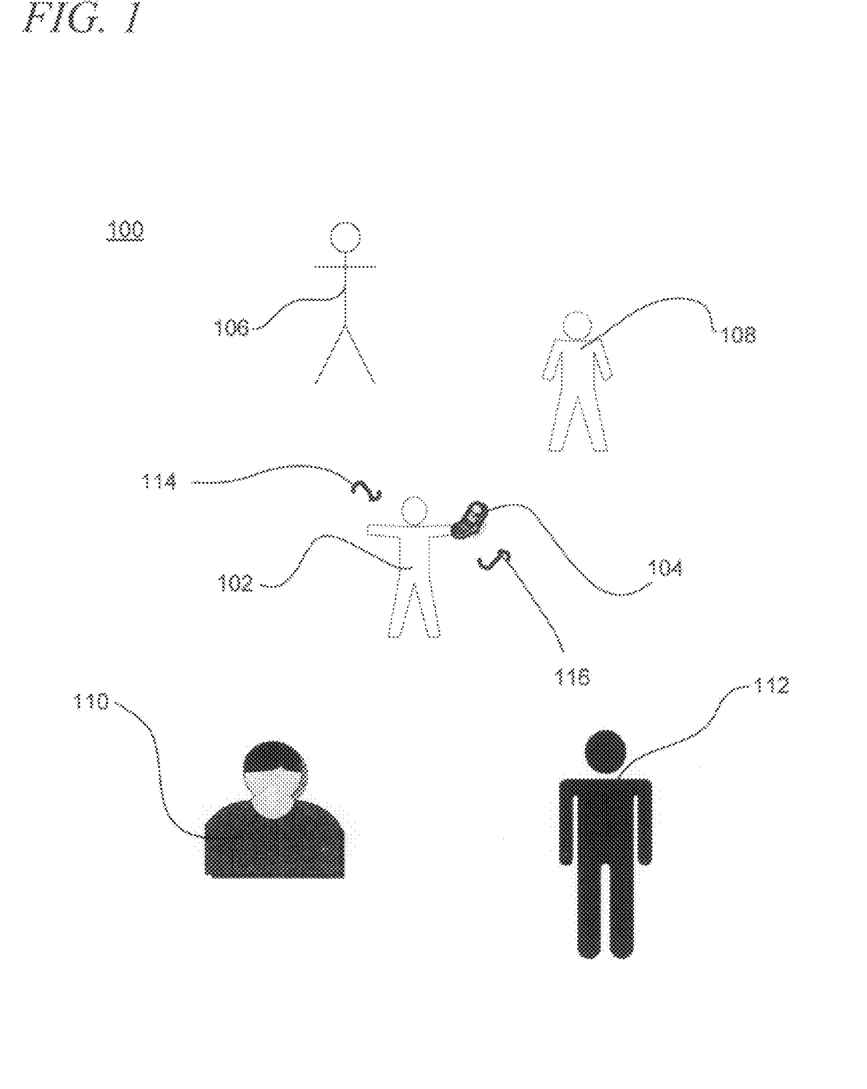
FIG. 1 is a pictorial representation of a wireless environment in accordance with an illustrative embodiment.

FIG. 1 is a pictorial representation of a wireless environment in accordance with an illustrative embodiment. FIG. 1 describes one embodiment of a wireless environment 100. The wireless environment may include a wireless user 102, a wireless device 104, and bystanders 106, 108, 110, and 112. The wireless device 104 may be a device configured to communicate using various communications' protocols, standards, and formats. The communications protocols may include time division multiple access (TDMA), co-division multiple access (CDMA), global systems for mobile communication (GSM), personal communication systems (PCS), wide local area networks (WLAN), WiWAX or any other suitable communications protocol.

The wireless device 104 may be a cellular phone, a Blackberry®, a digital media player, a personal digital assistant (PDA), a laptop computer, multi-mode device, or any other suitable wireless communications device. The wireless user 102 may use the wireless device 104 to communicate utilizing any number of wireless networks, data or packet networks, private networks, publicly-switched telephone networks, and other accessible communications networks. As illustrated in the wireless environment 100, the wireless user 102 may be unable to find a location that allows for private conversations and communications. As a result, any speech or verbal communications spoken into the wireless device 104 by the wireless 102 may be overheard, or listened to, by the bystanders 106, 108, 110, and 112.

Under some circumstances, the wireless user 102 may be uncomfortable with or unable to carry on a verbal conversation using the wireless device 104 because of privacy or security concerns. For example, the information shared or spoken may be intercepted or overheard by the bystanders 106, 108, 110, and 112. The wireless user 102 may be particularly unwilling to speak openly in the wireless environment 100 when sharing private, personal, business, or other information that the wireless user 102 prefers to keep private or secured.

In one embodiment, the wireless device 104 may be enabled for allowing greater call privacy using voice cancellation. The wireless user 102 communicates with another party through the wireless device 104 by speaking or otherwise communicating a voice communications signal 114. The voice communications signal 114 may include the speech and other noises spoken or initiated by the wireless user 102 for effective communication. The voice communications signal 114 may be spoken or otherwise emitted by the wireless user 102 during the process of carrying on a verbal conversation.

To ensure privacy, the wireless device 104 may emit or coordinate the emission of the response signal 116 or anti-voice signal.

The response signal 116 may be any of a number of signal types depending on the purpose as specified by the user and the available processing and battery power. In particular, the response signal 116 may be an inverse signal or a disruptive signal. The response signal 116 may be a digital approximation of the voice communications signal 114 with the only difference being that the response signal 116 is out of phase with the voice communications signal 114. For example, the response signal may be an inverse signal 180 degrees out of phase with the voice communication signal 114.

The response signal 116 may be approximated and generated by the wireless device 104 to destructively interfere with the voice communications signal 114. The response signal 116 may be emitted by the wireless device 104 to ensure that the voice communications signal 114 spoken by the wireless user 102 is substantially decreased or cancelled. The response signal 116 may function as a cancellation signal intended to be of equal amplitude and opposite phase of the voice communications signal 114.

As a result, the bystanders 106, 108, 110, and 112 may be unable to hear or understand a verbal conversation carried by the voice communications signal 114. In some cases, the wireless user 102 may feel more comfortable speaking in the wireless environment 100 using the wireless device 104 enabled for voice cancellation, even though the bystanders 106, 108, 110, and 112 may be in close proximity. The voice communications signal 114 and response signal 116 may combine during propagation to destructively interfere or generate a signal that sounds garbled to the bystanders 106, 108, 110, and 112.

In one example, the wireless environment 100 may be a public place, such as the lobby of a restaurant. In another example, the wireless user 102 may be walking along a street, or working in a cubicle. The wireless device 104 may generate the response signal 116 in response to one or more of amplitude and frequency (or volume and pitch) of the voice communications signal 114 as spoken by the wireless user 102. The wireless device 104 dynamically adjusts to the changes in pitch, volume, and other voice characteristics to ensure that the bystanders 106, 108, 110, and 112 are unable to hear or distinguish speech communicated in the voice communications signal 114. As a result, despite the bystanders' 106, 108, 110, and 112 proximity to the wireless user 102, it may be more difficult for them to hear the conversation carried through the voice communications signal 114 resulting in enhanced privacy and decreased noise pollution.

In another embodiment, the response signal 116 may be unable to completely destructively interfere with the voice communications signal 114. However, the response signal 116 may make the words and meaning of the conversation unintelligible by distorting or otherwise modifying the original voice communications signal 114 once combined. Under these circumstances, the response signal 116 may also be a distortion signal.

The distortion signal may broadcast in order to combine with the voice communications signal 114. Once the voice communications signal 114 and distortion signal combine, the originally spoken words and sounds become distorted, muddled, and otherwise unintelligible. In one example, the distortion signal may be the voice communications signal 114 played at a different pitch and with a slight time delay for making any signals overheard by the bystanders 106, 108, 110, and 112 seem like overlapping conversations. Pitch refers to the perceived fundamental frequency of a sound. In another embodiment, additional sounds, pre-recorded words, conversations, or noises, and frequent pitch changes may be integrated or played as part of the distortion signal. In another example, the response signal 116 may be an inverse signal generated at a lower power level with the purpose of convoluting or dampening the original communications signal 114.

Figure 2:
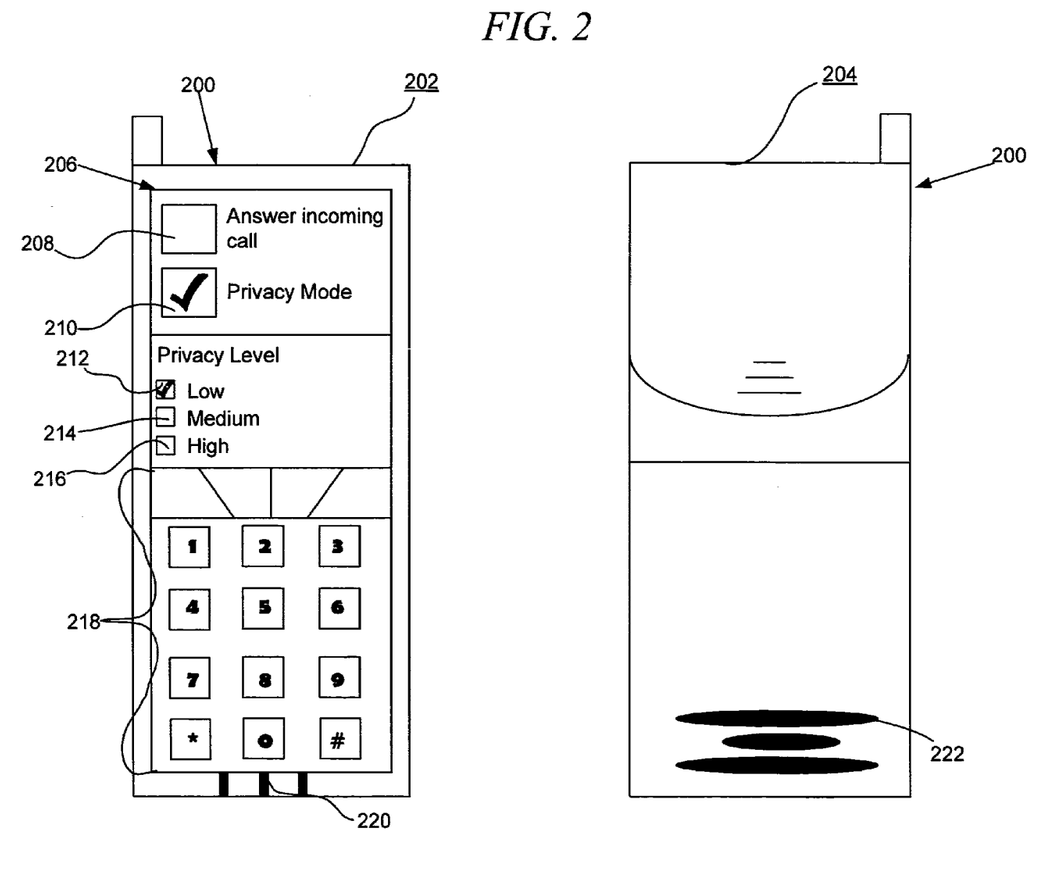
FIG. 2 illustrates views of a wireless device in accordance with an illustrative embodiment.

FIG. 2 illustrates views of a wireless device in accordance with an illustrative embodiment. The wireless device 200 illustrates a particular implementation of the wireless device 104 of FIG. 1. In particular, FIG. 2 illustrates a front view 202 and a rear view 204 of the wireless device 200. The wireless device 200 may include a display 206, buttons 208, 210, 212, 214, and 216, an interface 218, a microphone 220, and a speaker 222.

In another embodiment, the wireless device 200 may be a cordless telephone. For example, the wireless device 200 may be part of a cordless telephone system. The wireless device 200 may wirelessly communicate with a base station connected to a standard or voice over Internet Protocol telephone system. In one embodiment, the cordless telephone enabled with voice cancellation technology may include the same elements and features as the wireless device 200. In other embodiments, the response signal or waveform may be transmitted by a speaker that wirelessly communicates with the cordless handset or with the base station.

An externally linked speaker may be a fixed speaker or may be portable for ensuring that the user's conversation remains private regardless of location. Implementation of the wireless device 200 for a cordless telephone handset may provide additional security at a home or a business providing the advantages herein described. In one embodiment, the user may select both to activate the voice cancellation feature and a particular speaker from which the inverse waveform is broadcast using a handset or other device.

In one embodiment, the display 206 may be a touch screen display for receiving user input. The touch sensitive portions of the display 206 are referred to as buttons to simplify the description of the wireless device 200. The display 206 may display button 208 for allowing the user to answer or place a call, and button 210 for selecting a privacy mode feature or function. In one embodiment, once the user selects button 210, the buttons 212, 214, and 216 appear or are displayed for selecting a privacy level. In one embodiment, the user may select to distort a signal or to destructively interfere with a verbal conversation. The level of destructive interference may be linked with the privacy level.

The privacy level may be an amplitude or power output allotted to the privacy function. For example, when set to a low privacy mode, the wireless device 200 may transmit only an inverse signal that dampens the voice communication signal of a user, rather than completely destructively interfering with the voice signal. Similarly, at the highest level as selected by button 216, the wireless device 200 may be set to output the inverse signal at a strength or power level sufficient to severely cancel the voice communication signal generated by the user.

The user may also establish voice cancellation preferences for dialed or received calls for various contacts, area codes, or phone numbers. For example, one or more phone numbers associated with the user's boss may be assigned the highest privacy level for ensuring that the conversation between the parties is as private as possible. In other cases, the voice cancellation preferences may specify that the voice cancellation feature is completely disabled to preserve battery power.

The interface 218 may be used to perform the regular calling features of the wireless device and to receive user input. For example, the user may select one or more buttons within the interface 218, such as "*22" to activate a privacy mode for the wireless device. Similarly, the interface 218 may allow the user to end the voice cancellation or call privacy at any time before, during, or after voice communication.

The microphone 220 receives the voice signal as spoken by the user. The microphone 220 communicates the voice signal to a processor and other logic and signal processing components of the wireless device 200 for generating the inverse signal as further described in FIG. 5. Once the inverse signal is generated by the wireless device 200, the speaker 222 outputs the inverse signal as shown in the rear view 204 of the wireless device 200.

The speaker 222 may be placed in the rear of the wireless device 200 to ensure that the inverse signal propagates to effectively distort or destroy the voice signal as spoken by the user. In other embodiments, the speaker 222 may be positioned so that the user's hand does not interfere with the output of the inverse signal from the wireless device 200. The speaker 222 may be specially configured to broadcast power levels and frequencies necessary to destructively interfere with a voice signal spoken by the user without causing feedback through the microphone 220. In particular, an adaptive filter may be used to filter or digitally extract the response signal fed back through the microphone 220.

The wireless device 200 may be equipped to communicate with other devices using Bluetooth®, or other similar device-to-device communications standards. For example, the wireless device 200 may communicate with an external speaker enabling the external speaker to transmit the inverse signal instead of the wireless device 200. The external speaker may include a larger battery for broadcasting the response signal at the appropriate signal and may be worn or otherwise attached to the user. In another embodiment, the wireless device 200 may send the response signal to a laptop computer or another speaker-equipped device carried by the wireless user to be broadcast.

The display 206, buttons 208, 210, 212, 214, and 216, and interface 218 may include any number of configurations, interface elements, displays, touch screens, scroll wheels, and other elements for receiving user input and displaying information to the user.

Figure 3:
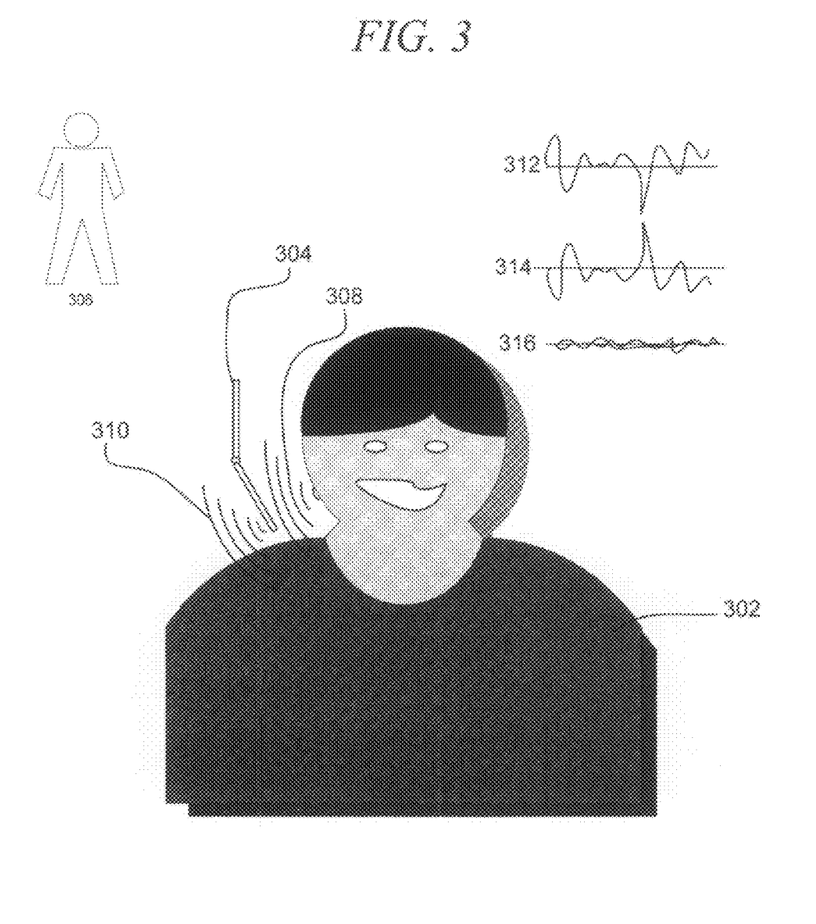
FIG. 3 is a pictorial representation of voice cancellation through a wireless device in accordance with an illustrative embodiment.

FIG. 3 is a pictorial representation of voice cancellation through a wireless device in accordance with an illustrative embodiment. FIG. 3 includes a wireless user 302, a wireless device 304, a bystander 306, voice communications 308, inverse signal 310, voice wave form 312, inverse wave form 314, and combined wave form 316. As shown, the voice communications signal 308 originates from the wireless user 302 may be electronically represented by the voice wave form 312. In this example, the response signal is the inverse signal 310.

The inverse signal 310 is generated by the wireless device 304 to destructively interfere with the voice communications signal 308 before it may be overheard by the bystander 306. The inverse signal 310 is electronically represented by the inverse wave form 314. The wireless device 304 may receive the voice communications signal 308 from the wireless user 302 and convert the voice communications signal 308 to the voice wave form 312. The voice wave form 312 may be used to generate the inverse wave form 314. As shown, the voice wave form 312 may be approximately or exactly the same as the inverse wave form 314, within digital signal processing limitations, except for when the inverse wave form 314 is out of phase (as shown, 180 degrees out of phase) with the voice wave form 312. When combined, as the voice communications signal 308 and inverse signal 310 propagate from the wireless user 302 and wireless device 304, the signals combine to destructively interfere with one another.

In particular, the audio combination of the signals as they propagate through the air and other communications mediums results in the combined wave form 316. As shown, the combined wave form 316 may be unintelligible or otherwise distorted when processed by the auditory system of the bystander 306. As a result, the conversation of the wireless user 302 with another party through the wireless device 304 may not be understood or otherwise discerned.

Figure 4:
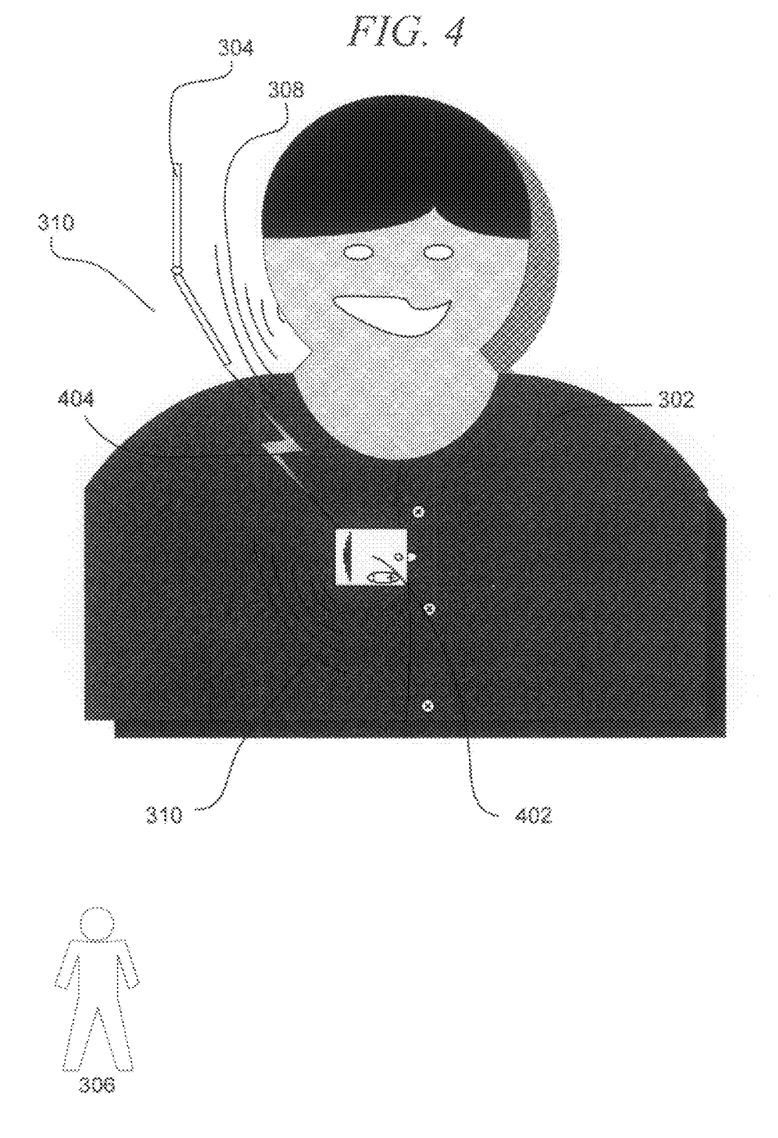
FIG. 4 is a pictorial representation of voice cancellation using a wireless speaker in accordance with an illustrative embodiment.

FIG. 4 is a pictorial representation of voice cancellation using a wireless speaker in accordance with an illustrative embodiment. In addition to the elements of FIG. 3, FIG. 4 may include an external speaker 402 and a wireless link 404. In one embodiment, the wireless device 304 may communicate with the external speaker 402 using a Bluetooth® connection. However, the wireless link 404 may be any type of wireless communications format suitable for communication between a wireless device and an externally-linked device. The external speaker may include voice cancellation logic or the voice cancellation logic may be part of the wireless device 304. The external speaker 402 may also include a transceiver, amplifier, and audio codec for playing the response signal.

The wireless device 304 may analyze the voice communications signal 308 in order to determine the inverse signal 310 that may be transmitted by the external speaker 402 to cancel or distort the voice communications signal 308. Once the inverse signal is transmitted to the external speaker 402 over the wireless link 404, the external speaker 402 broadcasts or transmits the inverse signal 310 to cancel out the voice communication signal 308 for ensuring the wireless user 302 may communicate in private.

The external speaker 402 may include a power button, a volume control, and other elements for controlling the operation of the external speaker 402. For example, the volume control may set the power used to transmit the inverse signal 310. The external speaker 402 may be worn on the wireless user's 302 person or clothing. In one embodiment, the external speaker 402 may be integrated with a piece of jewelry or clothing. The external speaker 402 may be used because transmitting the inverse signal 310 may quickly drain the battery of the wireless device 304 when transmitted from the wireless device 304. As a result, the wireless user 302 may be able to activate or use the external speaker 402 only when using a voice cancellation or privacy mode for enhanced security and privacy.

In another embodiment, the external speaker 402 may include a microphone for providing the wireless user 302 hands-free operation while carrying on a verbal conversation using the wireless device. As a result, the external speaker 402 may receive the voice communication signal 308 from the wireless user 302 to transmit the signal to the wireless device 304 and broadcast the inverse signal 310.

Figure 5:
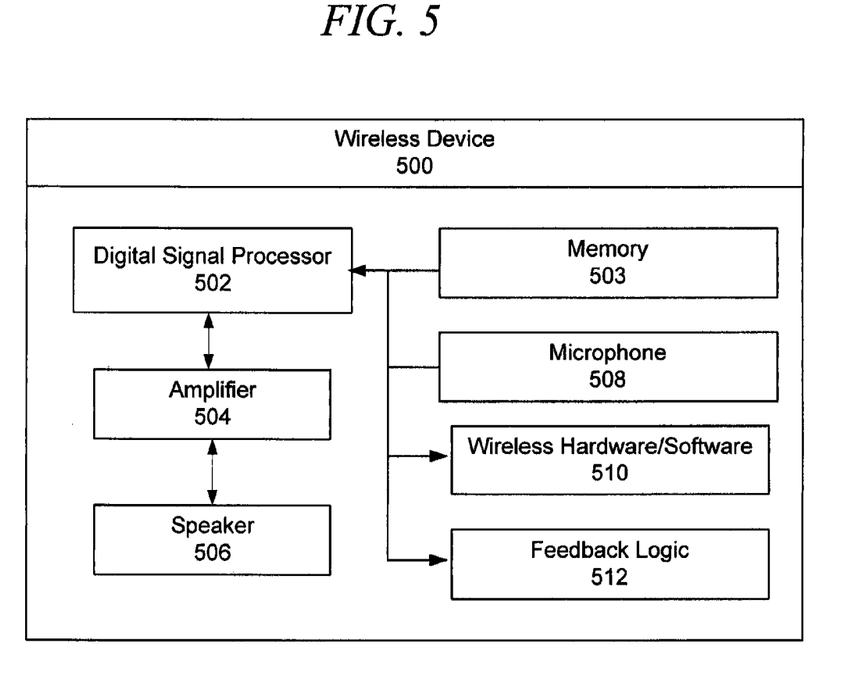
FIG. 5 is a block diagram of a wireless device using voice cancellation in accordance with an illustrative embodiment.

FIG. 5 is a block diagram of a wireless device using voice cancellation in accordance with an illustrative embodiment. FIG. 5 may include a wireless device 500 which may be a particular implementation of the wireless device 104 of FIG. 1. The wireless device 500 may include various elements, components, or modules, including a digital signal processor 502, a memory 503, an amplifier 504, a speaker 506, a microphone 508, wireless hardware/software 510, and feedback logic 512.

The wireless device 500 may be a combination of hardware and software elements and may be implemented using various structures and implementations. The example shown in FIG. 5 is given for illustration purposes only, and not as a limitation of required elements. The wireless device 500 may be enabled to provide call privacy using voice cancellation.

The digital signal processor 502 may be a signal processing device, logic, generator, or amplifier. The digital signal processor 502 may also be any processing device suitable for processing communications signals. In another embodiment, the digital signal processor may include other hardware and/or software implementing call privacy logic configured to generate the inverse signal broadcast from the speaker 506 of the wireless device 500 or an externally-linked speaker.

In particular, the digital signal processor 502 may include various pre-amplifiers, power amplifiers, digital-to-analog converters, and audio CODECs to dynamically generate a response signal to distort or destructively interfere with the specified verbal conversation. The digital signal processor 502 may alternatively be a digital logic or a voice cancellation software program executed by a standard processor to analyze the incoming voice communications in order to generate the response signal.

The microphone 508 may be an audio input device configured to receive the audio input, voice communications, and other noises from the user. The microphone 508 electronically communicates the voice communication signal to the digital signal processor 502. The digital signal processor 502 analyzes the voice communications signal in order to generate the inverse signal, such as inverse waveform 314 and corresponding inverse signal 310 of FIG. 3.

The wireless device 500 may include the feedback logic 512 or feedback loop, circuitry, or software for ensuring that the voice communication signal being communicated with another party through the telephone is not itself affected by the inverse signal broadcast from the speaker 506. The feedback logic 512 may include an adaptive or dynamic filter for filtering the response signal or portions of the response signal that feed back through the microphone 508 when broadcast through the speaker 506. As a result, the user is able to carry on a conversation clearly even though the signals and associated speech overheard by bystanders is distorted or undistinguishable.

The amplifier 504 may be used to amplify the inverse signal for output by the speaker 506. Each person naturally speaks at a different volume level. The amplifier 504 amplifies the inverse signal as needed to destructively interfere with the original voice communication signal. As previously described, a user may also set a privacy level for the wireless device 500. In some instances, the decision to select a specified privacy level may be based on the power output required for the wireless device. For example, to generate an inverse signal that is most likely to render the voice communications completely unintelligible may require substantial power through the speaker 506 which may quickly drain a battery of the wireless device 500. As a result, the user may select a privacy level based on the needed level of privacy and security balanced against the current battery and power availability. For example, the privacy level may set amplifier levels or amplitude settings at which the response signal is broadcast.

The memory 503 may be a storage medium, such as flash memory or dynamic random access memory. However, the memory may be a hard disk read-only memory, or other suitable form of volatile or nonvolatile memory. The memory 503 may store user preferences, data, information, applications, and instructions for execution by the digital signal processor 502 to implement the call privacy functions of the wireless device 500, and other electronic data used to implement the various features of the wireless device 500.

The wireless hardware/software 510 may be the hardware and software that implements the normal features and functions of the wireless device 500. In one embodiment, the wireless device 500 is a cellular phone and the wireless hardware/software 510 includes all logic, transceivers, display, interface, and other elements that enable the wireless device 500 to perform the standard features of a cellular phone.

Figure 6:
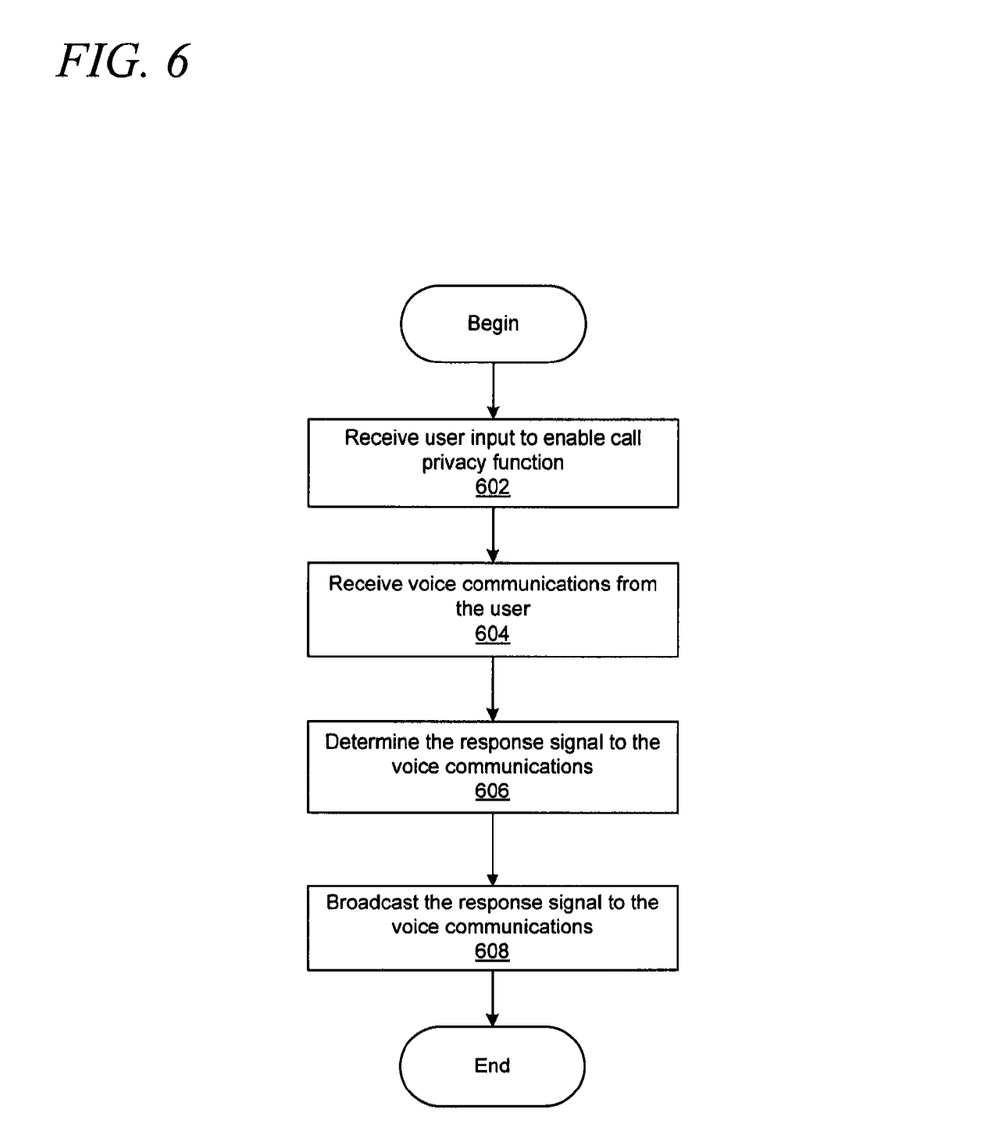
FIG. 6 is a flowchart of a process for voice cancellation in accordance with an illustrative embodiment.

FIG. 6 is a flowchart of a process for voice cancellation in accordance with an illustrative embodiment. The process of FIG. 6 may be implemented by a wireless device that may be configured to ensure greater privacy through voice cancellation. The process may begin by receiving user input to enable a call privacy function (step 602). The wireless device may be set by default to perform voice cancellation or may require a selection or other manual input from the user. The call privacy function may be enabled anytime, including during a conversation.

Next, the wireless device receives voice communications from the user (step 604). During (step 604), the user may speak to and otherwise carry on a verbal conversation. The wireless device determines the response signal to the voice communications (step 606). The speech and other audio noises from the user make up the voice communications. Additionally, any speech or audio noises that may be discernible to bystanders may also be considered voice communications. The response signal of the voice communications may be calculated or determined by a digital signal processor or signal processing element. The voice communications has a fingerprint including varying frequencies and amplitudes. In one embodiment, the response signal is an inverse signal that mimics the voice communications, including the changing frequencies and amplitudes except when the inverse signal is 180 degrees out of phase with the waves associated with the voice communications.

In another embodiment, the response signal distorts the original voice communications received from the user in step 604. The distortion signal may dampen and/or convolute the voice communications or make the voice communications unintelligible or garbage to a listening bystander.

The wireless device broadcasts the response signal to the voice communications (step 608). The inverse signal substantially cancels out the effect of the voice communications using destructive interference. The inverse signal may be alternatively generated to distort the voice communications when the two waveforms combine as they propagate through the air. The result is that the voice communications of the user are not easily overheard or monitored. In another embodiment, the wireless device may transmit the inverse signal to another device to be broadcast. For example, a Bluetooth-enabled wireless speaker may be attached to the user and may receive the inverse signal from the wireless device for transmission in order to ensure privacy and effective voice cancellation.

Figure 7:
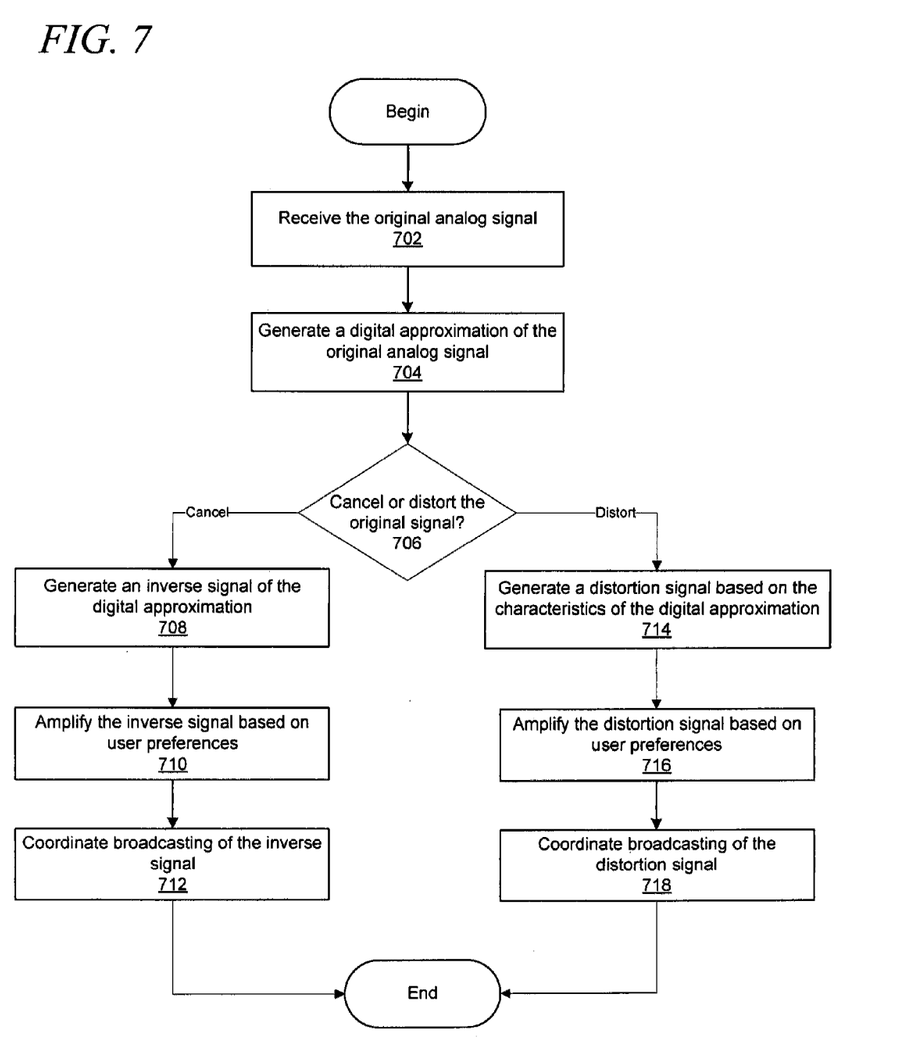
FIG. 7 is a flowchart of a process for generating a response signal in accordance with an illustrative embodiment.

FIG. 7 is a flowchart of a process for generating a response signal in accordance with an illustrative embodiment. The process of FIG. 7 may be implemented by a signal generator, digital signal processor, digital logic, amplifier, analog computing device, or signal processing application of a wireless communication device, such as a cellular telephone or handset of standard telephone. Alternatively, the process of FIG. 7 may be wholly or partly performed by an external speaker in communication with the wireless device.

The process may begin by receiving the original analog signal (step 702). The original analog signal may be the voice communications performed by a user of the voice cancellation equipped wireless device. The original analog signal may be the signal the user would like to use to prevent others from overhearing.

The signal generator generates a digital approximation of the original analog signal (step 704). The signal generator may use any number of pre-amplifiers, buffers, or analog-to-digital converters to generate the digital approximation.

Next, the signal generator determines whether to cancel or distort the original signal (step 706). The determination of step 706 may be made by user input regarding the type of response signal to be generated. The user input may include a real-time decision by the user regarding the call. Alternatively, the user may have set preferences for automatically enabling voice cancellation for the wireless device. The preferences may specify contacts, user names, phone numbers, or area codes that may initiate varying levels of destructive noise cancellation or distortion. In another embodiment, the voice cancellation feature may be enabled or disabled at any time during a call or communication based on manual user input.

If the signal generator determines to cancel the original signal, the signal generator generates an inverse signal of the digital approximation (step 708). The inverse signal may be the anti-original signal. The original analog signal or verbal conversation between a caller and call recipient consists of a spectrum of frequencies of different amplitudes. In order to effectively cancel out each waveform, the signal generator may filter each frequency separately, determine its frequency, and create the same frequency and amplitude at 180° out of phase.

The signal generator amplifies the inverse signal based on user preferences (step 710). For example, the user may have selected to attempt complete destructive interference with the original analog signal or just dampening of the original signal. The signal may also be generated in step 710 based on available battery power. Generating, amplifying, and broadcasting the inverse signal or a distortion signal may require significantly more battery power than normally used by the wireless device. As a result, an externally-linked battery powered or wired speaker may be especially beneficial. During step 710, the signal generator may also convert the inverse signal to an analog equivalent that may be broadcast through the available speaker device.

Next, the signal generator coordinates broadcasting of the inverse signal (step 712). The broadcasting may be performed by a speaker of the wireless device, an externally-linked speaker, or other communicating device. Because a verbal conversation, such as the original analog signal received in step 702 includes so many frequencies and fractions of frequencies, the signal generator may selectively approximate a narrow band of frequencies of the original analog signal for generating the inverse signal.

If the signal generator determines to distort the original signal in step 706, the signal generator generates a distortion signal based on the characteristics of the digital approximation (step 714). The distortion signal may have any number of characteristics or use formats in order to achieve the purpose of making the original analog signal less intelligible or understandable to bystanders or those who may overhear the verbal conversation.

In one embodiment, the distortion signal may include a previous conversation recorded by the user. Two conversations, when played simultaneously, may make distinguishing words and content from the original verbal conversation very difficult. In another embodiment, the original analog signal may be frequency modulated and phase shifted to produce a sound that is similarly confusing when overheard. As previously discussed, both the inverse signal and distortion signal may be subject to filtering by the wireless device to prevent unwanted feedback or confusion of the caller and receiving party communicating through the wireless device.

The signal generator amplifies the distortion signal on based user preferences (step 716) and coordinates broadcasting of the distortion signal (step 718) in steps that are very similar to those of steps 710 and 712.

The previous detailed description is of a small number of embodiments for implementing the invention and is not intended to be limiting in scope. The following claims set forth a number of the embodiments of the invention disclosed with greater particularity.

What is claimed:

1. A method for providing call privacy for a wireless communication device, the method comprising:
    receiving, at the wireless communication device, a voice communication from a user of the wireless communication device;
    processing, with the wireless communication device, the voice communication to determine a response signal in response to receiving the voice communication; and
    broadcasting, with the wireless communication device, the response signal about a periphery of the user as the voice communication is received, the broadcasting is enabled to be initiated: (1) in response to a user selection to perform call privacy, and (2) in response to user preferences stored in a memory that automatically activates the broadcasting based on caller information associated with a call wherein, the response signal is operative to cause the voice communication to be less discernible by one or more bystanders within the periphery of the user, and wherein the user preferences specify a privacy level for adjusting a power level of the response signal between a plurality of power levels between no response signal and a maximum response signal, the user preferences specifying a first privacy level, corresponding to a first output power level of the response signal, for a first contact and a second privacy level, corresponding to a second output power level of the response signal, for a second contact.

2. The method according to claim 1, wherein the receiving, processing, and broadcasting are performed by a cellular telephone, and wherein the privacy level manages battery usage for the cell phone to broadcast the response signal.

3. The method according to claim 1, wherein the processing and broadcasting is performed by an external device including a speaker in response to the external device receiving the voice communication from the wireless communication device.

4. The method according to claim 2, wherein the response signal is broadcast by an external speaker worn by the user and in communication with the cellular telephone.

5. The method according to claim 1, wherein the response signal is an inverse signal that destructively interferes with the voice communications, and wherein the response signal is a digital approximation of the voice signal and 180 degrees out of phase with the voice signal.

6. The method according to claim 1, wherein the response signal is a distortion signal generated from the voice communications signal played at a different pitch and with a time delay, and wherein the distortion signal combines with the voice communication during propagation to form a distorted signal, wherein the distorted signal is unintelligible by the one or more bystanders.

7. The method according to claim 1, wherein the response signal includes a pre-recorded conversation of the user, and wherein the response signal is broadcast simultaneously so the voice communication and pre-recorded conversation overlap when overheard by a bystander.

8. The method according to claim 1, wherein the wireless device is a cordless telephone communicating with a base station to perform wired communications utilizing standard telephone communications or voice over Internet Protocol communications.

9. The method according to claim 7, wherein the user preferences specify whether the response signal is an inverse signal or a distortion signal utilizing the pre-recorded conversation without user interaction.

10. The method according to claim 1, wherein the response signal is a frequency modulated and a phase shifted version of the voice communication signal that combines with the voice communication during propagation to be confusing to a bystander when overheard.

11. The method according to claim 1, further comprising: processing the voice communication utilizing an adaptive filter so that the response signal does not feedback into the voice signal.

12. The method according to claim 1, further comprising: automatically enabling and disabling a voice cancellation feature of the wireless communication device without user interaction to control generation of the response signal in response to the user preferences accessed from the memory for a number of contacts and the caller information.

13. A wireless device for voice communication, the system comprising:
a microphone configured to receive voice communication from a user;
a signal generator in communication with the microphone configured to process the voice communication to determine the voice communication and a response signal to the voice communication;
an amplifier configured to amplify the response signal to interfere with the voice communication according to a privacy level within user preferences stored in a memory of the wireless device, wherein the user preferences specify a privacy level for adjusting an amplitude of the response signal between a plurality of power levels defined between no response signal and a maximum response signal the user preferences specifying a first privacy level, corresponding to a first amplitude of the response signal, for a first contact and a second privacy level, corresponding to a second amplitude of the response signal, for a second contact; and
a speaker in communication with the signal generator configured to broadcast the response signal about a periphery of the user as the voice communication is received for reducing the voice communication discernible by one or more bystanders within the periphery of the user.

14. The wireless device according to claim 13, wherein the wireless device is a cellular telephone enabled for voice cancellation, and wherein the privacy level is utilized to manage battery life of the wireless device when generating the response signal.

15. The wireless device according to claim 13, wherein the response signal includes a pre-recorded conversation of the user, and wherein the response signal is broadcast simultaneously so the voice communication and pre-recorded conversation overlap to a bystander.

16. The wireless device according to claim 13, wherein the wireless device is a cordless telephone communicating with a base station to perform wired communications utilizing standard telephone communications or voice over Internet Protocol communications.

17. The wireless device according to claim 13, wherein the wireless device communicates wirelessly with an external speaker, and wherein the external speaker being configured to receive the response signal from the wireless device and broadcast the response signal to destructively interfere with the voice communications.

18. The wireless device according to claim 17, wherein the external speaker is part of a laptop of the user.

19. The wireless device according to claim 13, wherein the speaker is a wearable speaker worn by the user.

20. A method for processing a voice signal to generate a response signal, the method comprising:
receiving, at a wireless device, an original voice signal from a first party involved in a communication occurring through the wireless device;
digitally approximating, with the wireless device, the original voice signal;
generating, with the wireless device, a response signal to the original voice signal;
amplifying the response signal with the wireless device, according to a privacy level established by user preferences stored in a memory; and
broadcasting the response signal from the wireless device about a periphery of the first party to interfere with the original voice signal of the first party, the response signal being operative to cause the original voice signal to be dampened or substantially cancelled in response to the privacy level, such that the original voice signal is less discernable by one or more bystanders within the periphery, wherein the privacy level adjusts a power level of the response signal between a plurality of power levels defined between no response signal and a maximum response signal, the user preferences specifying a first privacy level, corresponding to a first power level of the response signal, for a first contact and a second privacy level, corresponding to a second power level of the response signal, for a second contact.

21. The method according to claim 20, further comprising: receiving the user preferences from the user for storage in the memory for generating the response signal, wherein the generating is enabled to be initiated (1) in response to user selection received in real-time and (2) without user interaction based on a pre-set selection of caller information accessed from the user preferences stored in the memory, wherein the user preferences specify whether the response signal is an inverse signal or a distortion signal.

22. The method according to claim 20, further comprising: controlling a speaker wirelessly linked with the wireless device, wherein the speaker is configured to broadcast the response signal.

23. The wireless device according to claim 21, wherein the user preferences automatically enable and disable a voice cancellation feature of the wireless device to control generation of the response signal based on the user preferences for a number of contacts and the caller information.

24. The wireless device according to claim 20, wherein the original voice signal is broadcast to a speaker, and wherein the speaker performs the digitally approximating, generating, amplifying, and broadcasting.

* * * * *